March 22, 1949.  W. H. HARSTICK  2,465,154
SPEED GOVERNOR FOR CENTRIFUGES
Filed Nov. 7, 1945
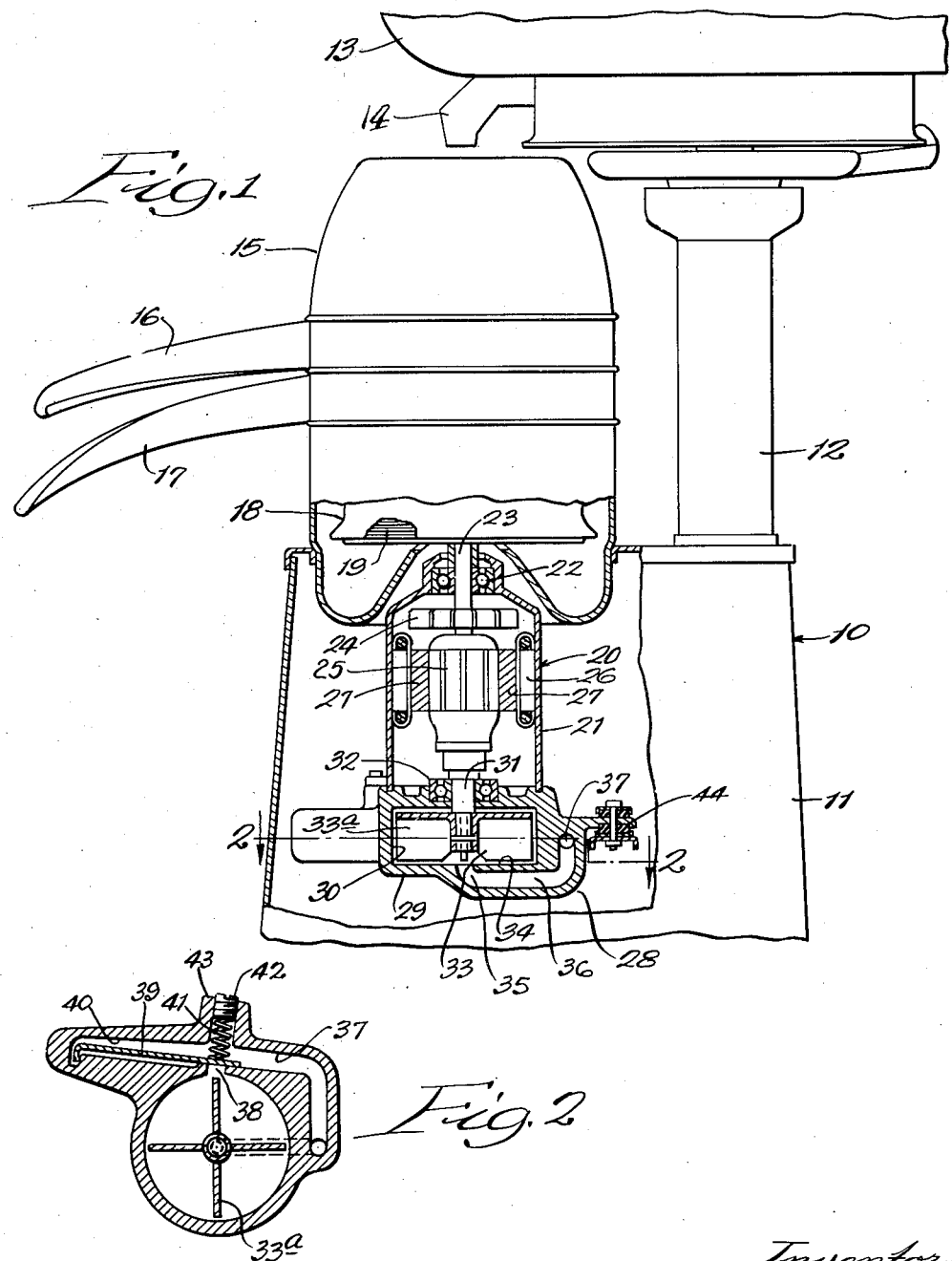
Inventor:
William H. Harstick,
By Paul O. Pippel
Attorney.

Patented Mar. 22, 1949

2,465,154

UNITED STATES PATENT OFFICE 2,465,154

SPEED GOVERNOR FOR CENTRIFUGES

William H. Harstick, Richmond, Ind., assignor to International Harvester Company, a corporation of New Jersey Application November 7, 1945, Serial No. 627,199

8 Claims. (Cl. 233—24)

This invention relates to a speed governor and particularly to a speed control means for power-driven devices such as cream separators or the like.

More specifically the invention concerns a novel mechanism for controlling the speed of a series wound electric motor.

One of the inherent qualities of a series wound electric motor is the speed variations at which the motor operates. The variations are frequently caused by changes in the line voltage, or they may be caused by excessive wear within the motor such as the pitting of the commutator bars due to sparking. Temperature changes within the motor likewise will cause variations of speed which are undesirable. A major variation, of course, is dependent upon the load applied to the motor and when said load varies considerably the speed of the motor varies likewise. In the operation of high-speed cream separators it is especially desirable that variations from the desired speed are kept to a minimum, despite the fact that the quantity of milk flowing to the separator may change at intervals. It is generally found that these quantity changes occur most frequently during the beginning and end of the separating operation.

It is an object of this invention, therefore, to provide a novel means for regulating the speed of a power actuating device.

Another object is to provide an improved speed control means for a series wound electric motor.

Another object is to provide an improved governor for a series wound electric motor utilizing fluid resistance to retard the speed of the motor.

Another object is to provide an improved speed control means for a series wound electric motor of the type used in conjunction with a cream separator.

A still further object is to provide a speed control means that will hold an electric series wound motor at a constant speed despite variations in the normal load applied or variations due to other causes.

Other objects will become apparent from the following detailed description when read in conjunction with the accompanying drawings, wherein:

Fig. 1 is an elevational view of a cream separator with a sectional showing of the power actuating device and its speed control means.

Fig. 2 is a sectional view taken along the line 2—2 of Fig. 1, showing the interior of the improved speed control means.

Referring to the drawing, a cream separator is generally designated by the numeral 10 and consists of a supporting structure 11 and a pedestal structure 12, which carries a supply tank 13 having a faucet 14. The supply tank 13 is positioned on the pedestal structure 12 above a regulating cover 15. The regulating cover 15 includes a well, not shown, for receiving whole milk from the supply can, and a pair of discharge spouts 16 and 17.

A conventional high-speed cream separating bowl 18 having a plurality of disks 19 is supported and driven by an electric motor 20. The electric motor 20 consists of a housing 21 and a bearing member 22 in which is journaled a vertical shaft 23. The shaft 23 extends upwardly into the separating bowl 18 and is provided with a heat dispelling fan 24.

An armature 25 is connected to the shaft 23 and rotates within a series wound coil 26 and field poles 27.

A speed governor is generally designated by the numeral 28 and consists of a concentric housing 29 having a cylindrical chamber 30. A shaft extension 31 of the motor 20 extends downwardly into the housing 29 and is axially supported by a bearing member 32. An impeller 33 having a plurality of impeller vanes 33ª is connected to the shaft extension 31 for rotation therewith. The vanes 33ª are in close proximity to an uninterrupted surface of the cylindrical chamber 30.

An annular wall 34 contains a fluid inlet opening 35 which is centrally positioned and substantially in alinement with the shaft extension 31. A fluid conduit 36, in communication with the inlet 35, extends transversely and upwardly in the housing 29 to a point where it joins a fluid conduit 37. The fluid conduit 37 extends rearwardly and transversely in the housing 29 and communicates with a fluid discharge opening 38.

A reed valve 39 is supported in an aperture 40 formed in the housing 29. The reed valve 39 is positioned over the fluid discharge opening 38 for normally restraining the flow of fluid from the chamber 30 into the fluid conduit 37.

Fluid pressure within the chamber 30 is counteracted by a spring means 41 which abuts the reed valve 39 and forces it against the discharge opening 38. A set screw 42 is threaded into a boss 43 in the housing 29 and permits variation of the pressure exerted by the spring means 41.

The motor 20 and the housing 21 are suitably shock mounted by a supporting cushion member 44.

When operating the cream separator, an electric motor is used that will function at a certain desired speed upon feeding a maximum quantity of whole milk to the separator bowl. At this speed and at lower speeds, the impeller will rotate and whirl a fluid within the concentric governor housing. The centrifugal pressure created at this point will be insufficient to unseat the valve from the discharge opening. Since the fluid is being whirled around within the governor housing and the friction on the walls of the chamber is such that there is little work done by the impeller, it is not effective as a governing means.

The fluid and the impeller as they are being whirled around can be compared to a fly-wheel, which, of course, does not have any retarding action upon the motor. The circular shape of the fluid is maintained by the walls of the concentric housing. The fluid, in other words, is being carried around or whirled with a fixed amount of inertia.

As the quantity of whole milk fed to the separator bowl decreases or when other variations take place, the electric motor and the impeller will increase in speed. The centrifugal force of the fluid within the housing is then sufficient to unseat the valve from the discharge opening. The fluid will then flow from the chamber through the conduits and back into the chamber. The chamber 30 and fluid conduit 36 are kept substantially full of fluid at all times. The circulation of fluid through the conduits and the constant change of direction of flow cause a sufficient load on the impeller so that the speed of the electric motor is governed. The energy expended in bringing the additional liquid into motion is effective to place a governing force on the motor. When the valve is closed, on the other hand, the impeller is freely rotatable. Stated in another manner, it is the change of the fluid in direction of flow of travel and in shape from a whirling motion to a linear motion and then back again to a whirling motion that causes the impeller to do work which requires a greater amount of power that results in the governing action.

The work thus performed by the impeller will compensate for the lesser loads occasioned by the variations previously stated. Thus a consistent load is maintained on the motor and the desired speed of the cream separator can be maintained. The amount of centrifugal fluid pressure necessary to unseat the valve can be regulated by a set screw provided for that purpose.

A full disclosure of the operation of the invention is apparent from the foregoing description. It is to be understood, however, that modifications can be made that do not depart from the spirit of the invention as indicated by the scope of the appended claims.

What is claimed is:

1. In combination with a power-actuating device having a rotatable shaft extension, a governor including an impeller connected to said shaft extension for constant rotation therewith, a concentric cylindrical housing surrounding said impeller and being formed with a fluid inlet opening and a fluid discharge opening, a fluid conduit means communicating with said fluid inlet and said fluid discharge openings, and a valve means positioned to seat over said discharge opening, said impeller being adapted to freely rotate a mass of fluid within the housing during a closed position of said valve means, said valve means adapted to open upon a predetermined amount of centrifugal fluid pressure created by said impeller, whereby thereafter fluid is moved through said fluid conduit, the energy required to move said fluid and the restriction of said fluid conduit imposing a load on said impeller.

2. In a cream separator having a bowl, a motor including a shaft to drive said bowl, a cylindrical housing enclosing an end of the motor shaft and including a constant rotating fluid impeller driven by said shaft, a closed fluid circulating system associated with said housing including a pressure responsive biased valve adapted to regulate the circulation of said fluid, said impeller being rotatable thereby freely rotating a mass of liquid with a fixed amount of inertia, whereby said pressure responsive biased valve will open upon a predetermined centrifugal pressure within said housing and thereafter the additional flow of fluid through said closed fluid circulatory system and the energy required to move the fluid through said closed fluid circulatory system will impose a load upon said impeller thereby governing the speed of said motor.

3. In combination with a power-actuating device having a rotatable shaft extension, a governor including a vaned impeller connected to said shaft extension, a concentric cylindrical housing surrounding said shaft extension and being formed with a fluid inlet opening and a fluid discharge opening, said impeller being rotatable thereby freely rotating a mass of liquid with a fixed amount of inertia, a fluid conduit means communicating with said fluid inlet opening and said fluid discharge opening, a valve means associated with said housing, said valve means being positioned to seat over said discharge opening, and a resilient means abutting said valve means for forcibly retaining said valve means over said discharge opening, whereby the release of said valve from said discharge opening will thereafter allow fluid to flow through said fluid conduit, the energy required to move said fluid through the fluid conduit causing a load to be placed upon said impeller and directly upon said power actuating device.

4. In a cream separator having a high-speed separating bowl, a high-speed series wound electric motor directly coupled to the separating bowl for driving the same, said motor being provided with a shaft extension, in combination with said motor of a governor including a housing having a cylindrical chamber, an impeller connected to said shaft extension for constant rotation within said chamber, said impeller being rotatable thereby freely rotating a mass of liquid with a fixed amount of inertia, a fluid inlet opening and a fluid discharge opening formed within said housing, a fluid conduit means associated with said housing, said conduit means being connected to said fluid inlet opening and said fluid discharge opening, and a valve means connected to said housing, said valve means being seated over said discharge opening, and adapted to open upon a predetermined centrifugal pressure within the chamber, whereby the fluid will move through said conduit and the energy required to move said fluid will place a governing load on said motor.

5. In a cream separator having a high-speed separating bowl, a high-speed series wound electric motor directly coupled to the separating bowl for driving same, said motor being provided with a shaft extension, in combination with said motor of a housing having a cylindrical chamber, a vaned impeller connected to said shaft extension for constant rotation within said chamber, said impeller being rotatable thereby freely rotating a mass of liquid with a fixed amount of inertia, a fluid inlet opening formed within the chamber, a fluid discharge opening formed in the periphery of said chamber, a fluid conduit means formed within said housing, said conduit means being in communication with said inlet opening and said discharge opening, a valve means connected within said conduit means, said valve means being seated over said discharge opening, and a resilient means abutting said valve means to force said valve means against said discharge opening, said valve means being adapted to open upon a predetermined centrifugal pressure within the chamber whereby fluid will move through said conduit and the energy required to move said fluid will place a governing load on said motor.

6. In a cream separator having a high-speed separating bowl, a high-speed series wound electric motor directly coupled to the separating bowl for driving same, said motor being provided with a shaft extension, in combination with said motor of a governor including a housing having a cylindrical chamber, an impeller connected to said shaft extension for rotation within said chamber, said impeller being rotatable thereby freely rotating a mass of liquid with a fixed amount of inertia, a fluid inlet opening and a fluid discharge opening formed within said housing, a fluid conduit means formed within said housing, said conduit means being in communication with said inlet opening and said discharge opening, a valve connected within said conduit means, said valve being seated over said discharge openings, and a resilient means abutting said valve to force said valve against said discharge opening, said valve being adapted to open upon a predetermined pressure within said chamber, whereby the energy required to move said fluid through said fluid conduit means will impose a load upon said impeller and said electric motor.

7. In a cream separator having a high-speed separating bowl, a high-speed series wound electric motor directly coupled to the separating bowl for driving the same, said motor being provided with a shaft extension, the combination with said motor of a governor including a housing having a cylindrical chamber, an impeller connected to said shaft extension for rotation within said chamber, said impeller being rotatable thereby freely rotating a mass of liquid with a fixed amount of inertia, a fluid inlet opening formed within said chamber and substantially in alinement with said shaft extension, a fluid discharge opening formed in the periphery of said chamber, a fluid conduit means formed within said housing, said fluid conduit means being in communication with said fluid inlet opening and said fluid discharge opening, a valve means connected within said fluid conduit means, said valve means being seated over said discharge opening, and a resilient means abutting said valve means to force said valve means against said discharge opening, said valve means being adapted to open upon a predetermined pressure within said chamber, whereby thereafter the fluid flowing through said fluid conduit means will be restricted by said fluid conduit means and the energy required to move said fluid through said conduit means will impose a load upon said impeller and said electric motor.

8. In a cream separator having a high-speed separating bowl, a high-speed series wound electric motor directly coupled to the separating bowl for driving same, said motor being provided with a shaft extension, in combination with said motor of a governor including a housing having a cylindrical chamber, an impeller, connected to the shaft extension for rotation within said chamber, said impeller being rotatable thereby freely rotating a mass of liquid with a fixed amount of inertia, a wall at the bottom of said chamber, said wall having a fluid inlet opening centrally located and substantially in alinement with said shaft extension, a fluid discharge opening formed in the periphery of said chamber, a fluid conduit means formed within said housing, said fluid conduit means having one end thereof in communication with said inlet opening and the other end thereof in communication with said discharge opening, a valve means positioned within said fluid conduit means, said valve means being seated over said discharge opening, and a resilient means abutting and forcing said valve means against said discharge opening, said valve means being adapted to open upon a predetermined amount of pressure within said chamber whereby thereafter the flow of fluid through said fluid conduit means will be restricted by said fluid conduit means and the energy required to move said fluid through said fluid conduit means will impose a load upon said impeller.

WILLIAM H. HARSTICK.

REFERENCES CITED

The following references are of record in the file of this patent:

UNITED STATES PATENTS

| Number | Name | Date |
|---|---|---|
| 712,048 | Diamant et al. | Oct. 28, 1902 |
| 1,008,201 | Schmucker | Nov. 7, 1911 |
| 1,106,588 | Schnitzler et al. | Aug. 11, 1914 |
| 1,124,715 | D'Olier et al. | Jan. 12, 1915 |
| 1,598,383 | Robertson | Aug. 31, 1926 |
| 1,835,811 | Pugsley | Dec. 8, 1931 |
| 2,080,804 | Brantly | May 18, 1937 |
| 2,130,528 | Alexander | Sept. 20, 1938 |
| 2,115,547 | Aikman | Apr. 26, 1938 |
| 2,196,434 | Allstrom | Apr. 9, 1940 |